US009987596B2

(12) United States Patent
Pigarev et al.

(10) Patent No.: US 9,987,596 B2
(45) Date of Patent: Jun. 5, 2018

(54) MEMBRANE GAS SEPARATION MODULE

(71) Applicant: PUBLICHNOE AKTSIONERNOE OBSCHESTVO "GAZPROM", Moscow (RU)

(72) Inventors: Anatoly Alekseevich Pigarev, g. Podosk (RU); Aleksei Valentinovich Bukin, g. Podolsk (RU); Sergei Stanislavovich Tolstov, Moscow (RU)

(73) Assignee: PUBLICHNOE AKTSIONERNOE OBSCHESTVO "GAZPROM", Moscow (RU)

( * ) Notice: Subject to any disclaimer, the term of this patent is extended or adjusted under 35 U.S.C. 154(b) by 0 days. days.

(21) Appl. No.: 15/526,278

(22) PCT Filed: Dec. 9, 2015

(86) PCT No.: PCT/RU2015/000863
§ 371 (c)(1),
(2) Date: May 11, 2017

(87) PCT Pub. No.: WO2016/195535
PCT Pub. Date: Dec. 8, 2016

(65) Prior Publication Data
US 2017/0341029 A1 Nov. 30, 2017

(30) Foreign Application Priority Data

Jun. 5, 2015 (RU) .................................. 2015121552

(51) Int. Cl.
*B01D 53/22* (2006.01)
*B01D 63/04* (2006.01)
(Continued)

(52) U.S. Cl.
CPC .......... *B01D 63/04* (2013.01); *B01D 65/003* (2013.01); *B01D 69/081* (2013.01); *B01D 69/10* (2013.01);
(Continued)

(58) Field of Classification Search
CPC .... B01D 69/10; B01D 2313/44; B01D 63/04; B01D 2319/04; B01D 65/003;
(Continued)

(56) References Cited

U.S. PATENT DOCUMENTS 4,961,760 A * 10/1990 Caskey .................. B01D 53/22
210/321.81
5,013,437 A * 5/1991 Trimmer ................ B01D 53/22
210/321.78
(Continued)

FOREIGN PATENT DOCUMENTS

GB 1566675 A 5/1980
RU 149982 U1 1/2015
(Continued)

OTHER PUBLICATIONS

International Search Report and Written Opinion for corresponding PCT Application No. PCT/RU2015/000863, filed Dec. 9, 2015.

*Primary Examiner* — Anthony Shumate
(74) *Attorney, Agent, or Firm* — Notaro, Michalos & Zaccaria P.C.

(57) ABSTRACT

The present invention relates to units for separation of gas mixtures using hollow fiber membranes and may be used in chemical, oil, gas and other industries. More specifically, this invention relates to the structure of the membrane gas separation module which may be applied, for instance, in membrane separation units for helium concentrate. The membrane gas separation module comprises the horizontal body with end covers and membrane cartridges made of a
(Continued)

bundle of hollow fibers and located in an inversed manner in relation to the center. The body comprises symmetrical end sections of large diameter which are mated by conical transition sections with the central section of minor diameter. In this case length of end sections corresponds with length restricted by the body end and input area of membrane cartridges, and central section inner diameter is configured to provide both free mounting/dismounting of membrane cartridges and tight fit thereof at the sealing point with ring gaskets. Feed gas input nozzles are located on end sections of the body perpendicularly to its longitudinal axis in front of input areas of membrane cartridges, permeate output nozzles are located on end sections of the body near end covers perpendicularly to the body longitudinal axis. The technical result is reduction of weight and dimensional properties of the membrane module and the whole gas separation unit in general, as well as reduction of labor intensity of operations during mounting/dismounting of body end covers of the membrane module.

1 Claim, 1 Drawing Sheet

(51) Int. Cl.
B01D 65/00 (2006.01)
B01D 69/08 (2006.01)
B01D 69/10 (2006.01)

(52) U.S. Cl.
CPC ...... B01D 2257/11 (2013.01); B01D 2313/04 (2013.01); B01D 2313/20 (2013.01); B01D 2313/44 (2013.01); B01D 2319/04 (2013.01)

(58) Field of Classification Search
CPC ............ B01D 2313/04; B01D 2313/20; B01D 2257/11; B01D 69/081
See application file for complete search history.

(56) References Cited

U.S. PATENT DOCUMENTS

| 5,411,662 | A * | 5/1995 | Nicolas, Jr. ............ B01D 53/22 210/134 |
| 9,623,164 | B2 * | 4/2017 | Meyer ...................... A61M 1/16 |
| 9,776,893 | B2 * | 10/2017 | Wiemers ................. C02F 1/463 |
| 2003/0017142 | A1 * | 1/2003 | Toner .................. A61M 1/3472 424/93.7 |
| 2004/0045893 | A1 * | 3/2004 | Watanabe ............ B01D 63/022 210/321.79 |
| 2005/0029192 | A1 * | 2/2005 | Arnold ................... B01D 61/02 210/641 |
| 2005/0121391 | A1 * | 6/2005 | Koch ...................... B01D 63/02 210/650 |
| 2005/0161388 | A1 * | 7/2005 | Williams ........... B01D 19/0031 210/321.8 |
| 2006/0124529 | A1 * | 6/2006 | Schott .................. B01D 53/225 210/321.6 |
| 2007/0163943 | A1 * | 7/2007 | Collins ..................... A45F 3/20 210/335 |
| 2010/0326278 | A1 * | 12/2010 | Nakamura ............. B01D 53/22 96/8 |
| 2011/0189724 | A1 * | 8/2011 | Rapp ...................... C12M 23/42 435/29 |
| 2012/0137879 | A1 * | 6/2012 | Taylor ................ B01D 19/0031 95/46 |
| 2012/0304856 | A1 * | 12/2012 | Kanetsuki ............ B01D 53/228 95/47 |
| 2013/0059371 | A1 * | 3/2013 | Shevitz .................. C12M 29/16 435/297.4 |
| 2015/0053083 | A1 * | 2/2015 | Taylor .................... B01D 63/04 96/6 |
| 2016/0136545 | A1 * | 5/2016 | Takeda ................. B01D 27/146 210/232 |
| 2016/0151744 | A1 * | 6/2016 | Visser .................. B01D 63/022 96/8 |
| 2017/0050148 | A1 * | 2/2017 | Taniguchi .............. B01D 63/04 |

FOREIGN PATENT DOCUMENTS

| WO | 003086592 A1 | 10/2003 |
| WO | 2006062791 A2 | 6/2006 |

* cited by examiner

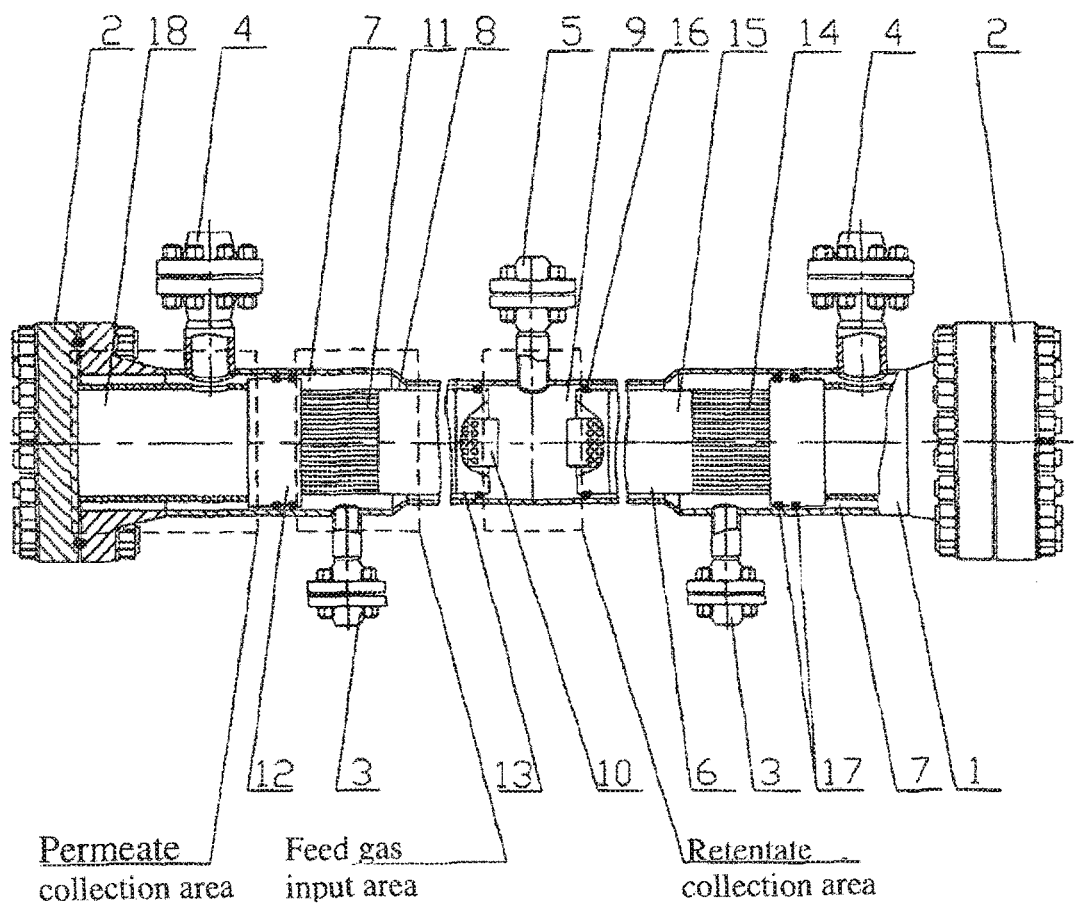

MEMBRANE GAS SEPARATION MODULE

The present invention relates to units for separation of gas mixtures using hollow fiber membranes and may be used in chemical, oil, gas and other industries. More specifically, this invention relates to the structure of the membrane gas separation module which may be applied, for instance, in membrane separation units for helium concentrate.

Nowadays special attention is paid to sustainable use of natural resources, including their extraction, processing and transportation. Helium is raw component required in various branches of industry, and for this very reason development of technical solutions, application whereof will make it possible to process natural gas more efficiently for the purpose of maximum extraction of helium therefrom, remains to be the current problem.

Technologies and structures of membrane gas separation units may be successfully used in order to solve such a task.

These modular units comprise a membrane stand, a valve assembly, maintenance areas and intrablock pipelines. The membrane stand is an assembly of several parallel membrane modules combined with pipelines and manifolds of separated gas mixture input (feed gas), processed gas output (retentate) as well as output of helium-rich gas (permeate). The membrane gas separation module comprises the vertical or horizontal cylindrical body, end covers, membrane cartridge located inside the body and made as a bundle of hollow polymeric fibers around the axial perforated pipe inside the straight case, support elements are installed between the cartridge and the cover. Feed gas input and permeate output are generally performed through branch pipe channels combined with end covers, retentate output is performed through the branch pipe located perpendicularly to the longitudinal axis of the body.

These structures require constant improvement in order to ensure reliability of equipment operation, reduction of weight and dimensional properties, prompt and safe mounting/dismounting of both separate structural elements and the unit in general when performing routine operations.

There is a known unit for purification of gas mixture using paralleled membrane gas separators (utility model patent No. RU 149982 dated Jan. 27, 2015) which was selected by the applicant as the closest analog. Each membrane gas separator comprises the body, nozzles connected with corresponding branch pipes and at least two membrane gas separation cartridges which are installed in an inversed manner in relation to the center. Each cartridge comprises a cylindrical bundle of hollow fibers and two frontal fillers wherein ends of hollow fibers are sealed. Ends of hollow fibers on end surface of the filler located near the module end cover are open for free discharge of permeate from the inner fiber space, while ends of hollow fibers are fully sealed on the frontal filler on the opposite cartridge end near the module center. Outgoing flow and retentate flow nozzles are located in the central portion of the body perpendicularly to the axis thereof, whereas permeate nozzles are located on body end covers.

The disadvantage of this unit is location of permeate output nozzles on body end covers. Said nozzles are connected with relevant pipelines which also have to be mounted/dismounted upon mounting/dismounting of the body end cover that leads to increase of labor intensity of these operations. Besides, permeate output nozzles on body end covers and pipelines connected thereto increase overall length of membrane modules and the whole gas separation unit in general.

Another disadvantage of this unit is location of the feed gas input nozzle in the central portion of the body. The channel inside the body in the form of an annular gap between the inner surface of the body and outer surface of cartridge shielded area located near the module center is made for passage of feed gas from the input nozzle to cartridge input area which is located near the module end. Presence of this annular channel determines increase of body diameter in relation to cartridge diameter at the location of cartridge shielded area and thus increase of membrane module weight, as well as weight of the whole gas separation unit in general. Apart from that, retentate output nozzles in membrane cartridges are connected by means of a bushing, presence whereof complicates the structure and increases membrane module length.

No structures of membrane gas separation modules characterized by the whole set of essential features of the claimed technical solution was discovered as a result of performance of information retrieval by the applicant.

The technical task which is to be solved by the present invention is improvement of the structure of the single membrane module providing efficient and reliable operation as part of the modular gas separation unit.

The set task is solved through the suggested invention, according to which known features of the membrane gas separation module, such as horizontal cylindrical body, end covers, at least two membrane cartridges with input and shielded areas located inside the body in an inversed manner in relation to the central lateral axis and comprising cylindrical bundles of hollow fibers, ends whereof are sealed on frontal fillers in such a way that ends of sealed hollow fibers on the end surface of the filler located near the module end cover are open, whereas ends of hollow fibers are fully sealed on the frontal filler on the opposite end of the cartridge near the body center, feed gas input nozzles, retentate output nozzle and permeate output nozzles, have the following distinctive aspects. The body comprises symmetrical end sections of large diameter which are mated by conical transition sections with the central section of minor diameter. In this case length of end sections corresponds with length restricted by the body end and input area of membrane cartridges, and central section inner diameter is configured to provide free mounting/dismounting of membrane cartridges to the sealing point with ring gaskets, behind which it is reduced to the size ensuring tight fit of membrane cartridges in the body. Feed gas input nozzles are located on end sections of the body perpendicularly to its longitudinal axis in front of input areas of membrane cartridges, permeate output nozzles are located on body end sections near end covers perpendicularly to the body longitudinal axis.

The technical result obtained from this invention is reduction of weight and dimensional properties of the membrane module and the whole gas separation unit in general, as well as reduction of labor intensity of works during mounting/dismounting of body end covers of the membrane module.

The invention is explained in more detail by the drawing (FIG. 1) whereon the general view of the membrane gas separation module is illustrated (side elevation).

The membrane module comprises the cylindrical body 1, end covers 2, feed gas input nozzles 3, permeate output nozzles 4 and retentate output nozzles 5. At least two membrane cartridges 6 are located inside the body in an inversed manner in relation to the central lateral axis. The body contains symmetrical end sections 7 of large diameter mated by conical transition sections 8 with the central section 9 of minor diameter. Length of end sections of large diameter corresponds with length restricted by the body end and input area 14 of membrane cartridges 6. Inner diameter of the body central section 9 corresponds with outer diameter of shielded area of membrane cartridges 6 and is configured to provide free mounting/dismounting thereof to the sealing point with ring gaskets 16, behind which inner diameter of the body central portion is reduced to optimum size ensuring tight fit of membrane cartridges in the body.

Membrane cartridges are made as bundles of hollow polymeric fibers 11 around the axial perforated pipe 10 and have their ends sealed in frontal fillers 12 and 13. Ends of sealed hollow fibers on the end surface of the filler 12 located near the module end cover are open, whereas ends of hollow fibers are sealed fully on the frontal filler 13 on the opposite end of the cartridge near the module center. Membrane cartridges have input area 14 located on body end sections and shielded area 15 located on the body central section. The membrane cartridge shielded area is characterized by presence of the outer shield made of impermeable material and enclosed by filtration cloth for mechanical dust arresting.

The body further comprises feed gas input, retentate and permeate collection areas. Feed gas input areas are formed by the body inner surface on end portions and channels of feed gas input from nozzles 3. Permeate collection areas are formed by the body inner surface on end portions, end surfaces of fillers 12 of cartridges with open ends of hollow fibers and channels of permeate output to nozzles 4. Retentate collection area is formed by the body inner cavity in the central portion, end surfaces of fillers 13 with closed ends of hollow fibers and the channel of retentate output to the nozzle 5.

Feed gas output nozzles 3 are located perpendicularly to the body longitudinal axis in front of input areas 14 of membrane cartridges 6. Permeate output nozzles 4 are located on body end sections perpendicularly to the longitudinal axis thereof. The retentate output nozzle 5 is located in the middle of the body central portion perpendicularly to its longitudinal axis.

Sealing of membrane cartridges 6 with the body 1 on the central section is made by means of ring gaskets 16, as well as by means of ring gaskets 17 on end sections. Grooves for allocation of ring gaskets 16 and 17 therein with corresponding machining dimensions for sections of the body inner diameter at sealing points thereof are made on frontal fillers 12 and 13 of membrane cartridges 6.

Support elements 18 located between frontal fillers 12 of membrane cartridges and end covers 2 are placed in the body. Support elements may be made, for example, as a cylindrical bushing with a relevant hole for the permeate output channel in nozzles 4.

The unit operates as follows.

Feed gas enters the membrane module through channels of nozzles 3 located on body end sections 7 in front of input areas 14 of membrane cartridges 6 to feed gas input areas and is distributed in the annular space between the body inner surface and input area outer surface of membrane cartridges 6. Then feed gas penetrates cartridges between membrane fibers 11 and flows along membrane fibers to opposite cartridge ends that is ensured by presence of the outer shield. As long as feed gas flows therefrom, a portion of the flow (permeate) penetrates fibers through membranes. Gas (retentate) which does not penetrate membranes is discharged through holes in central pipes 10 from central branch pipes of cartridges to collection area located in the body center, and from the membrane module through the channel of the retentate output nozzle 5. Permeate comes out freely through inner open holes of membrane fibers 11 to collection areas and is removed from the membrane module through corresponding channels of nozzles 4 located on body end portions perpendicularly to the longitudinal axis thereof.

Apart from sealing, ring gaskets 16 and 17 fulfill the function of delimitation of gas flow areas. Presence of ring gaskets 16 excludes impermissible overflow of feed gas to retentate collection area bypassing hollow fiber membranes, and ring gaskets 17 prevent feed gas from entering permeate collection area bypassing hollow fiber membranes.

There appears a great differential pressure (up to 10 MPa) in the body between feed gas input areas and permeate collection areas during module operation which can cause displacement of membrane cartridges 6 towards end covers 2, whereby feed gas will enter channels of nozzles 4 bypassing hollow fiber membranes. Support elements 18 prevent possibility of displacement of cartridges, allow withstanding the load due to action of differential pressure and do not hinder free passage of permeate flow from collection area to the nozzle 4 channel.

Location of permeate output nozzles on body end sections excludes performance of labor-intensive operations of mounting/dismounting of pipelines connected to the body end cover during its mounting/dismounting.

Location of feed gas input nozzles according to the present invention provides supply of original flow directly to input area of each membrane cartridge that reduces the volume of feed gas input area significantly and avoids the necessity for presence of a great annular channel (like that of the prior art) between shielded area of cartridges and body inner surface. This enables to reduce diameter of the body central portion wherein shielded area of cartridges is located to required dimensions, which at the same time ensure free mounting/dismounting of membrane cartridges and tight fit thereof at the sealing point that in its turn leads to reduction of weight and dimensional parameters.

Seals of membrane cartridges with the body made using ring gaskets have the following advantages. Ring gaskets 16 simplify the structure of the membrane module considerably (as compared to the prior art), because they exclude application of more complex parts in terms of structure and assembly, e.g. bushings, that allows making an output retentate branch pipe in membrane cartridges flush with the cartridge end surface. As a result, retentate collection area is reduced which also leads to reduction of module length.

Moreover, positive aspects should also include the fact that embodiment of the membrane gas separation module with location of structural elements according to the present invention allows for reasonable arrangement of gas flow distribution which contributes to maximum use of the working surface of membrane cartridges. This increases unit operating efficiency.

All features of the present inventions may be implemented as certain structural elements (parts, assembly units) of the membrane gas separation module using conventional technologies for manufacture of pipelines and devices.

The suggested membrane module is structurally simple, easy to manufacture and allows providing efficiency of helium extraction from natural gas without significant additional costs.

This technical solution may be implemented in structures of modules operating as part of skid mounted equipment of plants for membrane separation of helium concentrate at oil, gas and condensate fields.

However, it should be mentioned that this invention is not limited by application only for helium extraction from natural gas, and may be successfully used in equipment and industrial processes where there is a need to separate gas mixture from any other blend composition.

By the present time design documentation has been elaborated and calculations of basic geometrical and process parameters have been made for the suggested technical solution of the membrane module.

Thus, the present invention solves the set task of structural improvement of the single membrane gas separation module and provides the specified technical result that eventually allows reducing metal consumption, material costs for unit manufacture and operational expenses considerably.

The invention claimed is:

1. The membrane gas separation module comprising horizontal cylindrical body, end covers, at least two membrane cartridges with input and shielded areas located inside the body in an inversed manner in relation to the central lateral axis and comprising cylindrical bundles of hollow fibers, ends whereof are sealed on frontal fillers in such a way that ends of sealed hollow fibers on the end surface of the filler located near the module end cover are open, whereas ends of hollow fibers are fully sealed on the frontal filler on the opposite end of the cartridge near the body center, feed gas input nozzles, retentate output nozzle and permeate output nozzles, characterized in that the body comprises symmetrical end sections of large diameter which are mated by conical transition sections with the central section of minor diameter, whereby length of end sections corresponds with length restricted by the body end and input area of membrane cartridges, central section inner diameter is configured to provide free mounting/dismounting of membrane cartridges to the sealing point with ring gaskets, behind which it is reduced to the size ensuring tight fit of membrane cartridges in the body, feed gas input nozzles are located on end sections of the body perpendicularly to its longitudinal axis in front of input areas of membrane cartridges, permeate output nozzles are located on end sections of the body near end covers perpendicularly to the body longitudinal axis.

* * * * *